US012376003B2

(12) United States Patent
Talasila et al.

(10) Patent No.: US 12,376,003 B2
(45) Date of Patent: Jul. 29, 2025

(54) PUBLIC SERVICE ANSWERING POINT CALL ROUTING ISSUE DETECTION AND RESOLUTION

(71) Applicant: AT&T Intellectual Property I, L.P., Atlanta, GA (US)

(72) Inventors: Manoop Talasila, Branchburg, NJ (US); Jun Hu, Holmdel, NJ (US); Anwar Syed Aftab, Budd Lake, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 559 days.

(21) Appl. No.: 17/805,114

(22) Filed: Jun. 2, 2022

(65) Prior Publication Data
US 2023/0397087 A1   Dec. 7, 2023

(51) Int. Cl.
*H04W 40/34* (2009.01)
*H04W 4/90* (2018.01)
*H04W 40/24* (2009.01)

(52) U.S. Cl.
CPC .......... *H04W 40/34* (2013.01); *H04W 4/90* (2018.02); *H04W 40/248* (2013.01)

(58) Field of Classification Search
CPC ...... H04W 40/34; H04W 4/90; H04W 40/248
See application file for complete search history.

(56) References Cited

U.S. PATENT DOCUMENTS

| | | | |
|---|---|---|---|
| 10,291,777 B1* | 5/2019 | Luo ................ | H04M 3/5116 |
| 10,498,894 B1* | 12/2019 | Mongrain .......... | H04M 3/5232 |
| 11,164,096 B1* | 11/2021 | Martin .............. | G01S 5/0244 |
| 2006/0068753 A1* | 3/2006 | Karpen ............. | H04L 65/1069 |
| | | | 455/404.2 |
| 2009/0296899 A1* | 12/2009 | Beason ............. | H04Q 3/72 |
| | | | 379/45 |
| 2010/0093305 A1* | 4/2010 | Reich .............. | H04W 24/08 |
| | | | 455/404.1 |
| 2017/0150335 A1* | 5/2017 | Self ................ | H04W 4/90 |
| 2022/0141637 A1* | 5/2022 | Pellegrini .......... | H04W 4/12 |
| | | | 455/404.1 |
| 2023/0224405 A1* | 7/2023 | Anagnostou ........ | H04M 3/5116 |
| | | | 379/45 |

\* cited by examiner

*Primary Examiner* — Sujoy K Kundu
*Assistant Examiner* — Weibin Huang
(74) *Attorney, Agent, or Firm* — Guntin & Gust, PLC; Mark Wilinski

(57) ABSTRACT

The described technology is generally directed towards public service answering point (PSAP) call routing issue detection and resolution. A PSAP call routing issue detection tool is disclosed. The PSAP call routing issue detection tool can be configured to identify PSAP call routing problems in a cellular network. The PSAP call routing issue detection tool can present the PSAP call routing problems for further analysis and correction by cellular network engineers. The PSAP call routing issue detection tool can furthermore identify and suggest call routing corrections to address identified PSAP call routing problems. The PSAP call routing issue detection tool can optionally also automatically correct identified PSAP call routing problems according to suggested call routing corrections.

20 Claims, 10 Drawing Sheets

PUBLIC SERVICE ANSWERING POINT CALL ROUTING ISSUE DETECTION AND RESOLUTION

TECHNICAL FIELD

The subject application is related to cellular communication networks, and more particularly, to call routing via cellular communication networks.

BACKGROUND

Cellular service providers route emergency calls, such as 911 calls, to public service answering points (PSAPs), such as local 911 response centers. In order to route an emergency call to a correct local PSAP, a cellular service provider may first attempt to determine a location of a user equipment (UE) that originates the emergency call. Next, the cellular service provider may determine a correct PSAP for the UE location. Finally, the cellular service provider may route the emergency call to the correct PSAP.

It is critical to reduce errors in emergency call routing. Lives can be at increased risk with every second of call routing delay. When a call is incorrectly routed to the wrong PSAP, the PSAP or the cellular service provider may attempt to re-route the call to the correct PSAP, with a corresponding loss of valuable emergency personnel response time. Furthermore, in some instances, incorrect routing of emergency calls can overload a PSAP, which can degrade the PSAP's response to all emergency calls.

The above-described background is merely intended to provide a contextual overview of some current issues and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
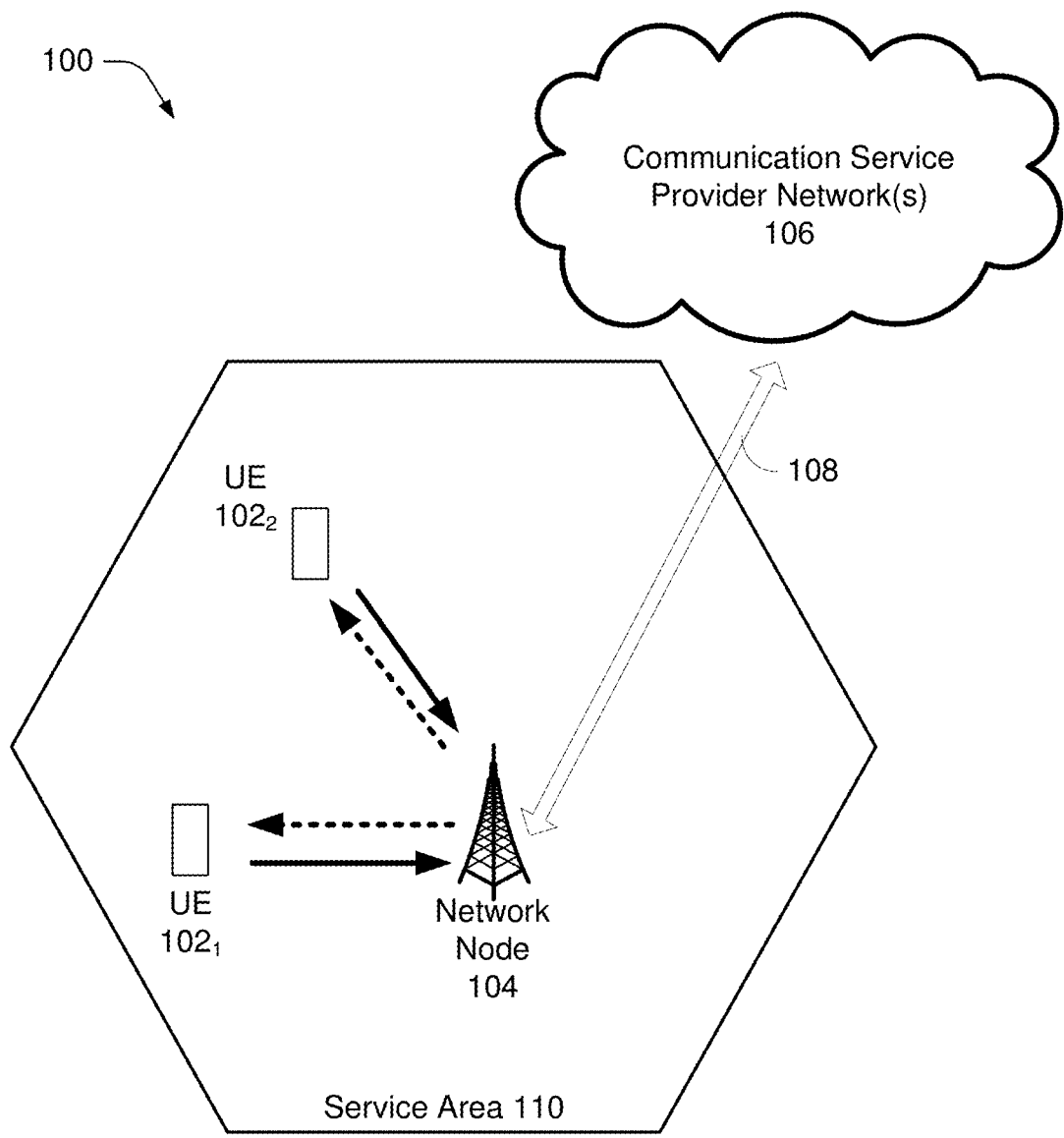
FIG. 1 illustrates an example wireless communication system, in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details, and without applying to any particular networked environment or standard.

One or more aspects of the technology described herein are generally directed towards public service answering point (PSAP) call routing issue detection and resolution. A PSAP call routing issue detection tool is disclosed. The PSAP call routing issue detection tool can be configured to identify PSAP call routing problems in a cellular network. The PSAP call routing issue detection tool can present the PSAP call routing problems for further analysis and correction by cellular network engineers. The PSAP call routing issue detection tool can furthermore identify and suggest call routing corrections to address identified PSAP call routing problems. The PSAP call routing issue detection tool can optionally also automatically correct identified PSAP call routing problems according to suggested call routing corrections. Further aspects and embodiments of this disclosure are described in detail below.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," "subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," "BS transceiver," "BS device," "cell site," "cell site device," "gNode B (gNB)," "evolved Node B (eNode B, eNB)," "home Node B (HNB)" and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments have been described herein in the context of 4G, 5G, or other next generation networks, the disclosed aspects are not limited to a 4G or 5G implementation, and/or other network next generation implementations, as the techniques can also be applied, for example, in third generation (3G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), LTE frequency division duplex (FDD), time division duplex (TDD), 5G, third generation partnership project 2 (3GPP2), ultra mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology. In this regard, all or substantially all aspects disclosed herein can be exploited in legacy telecommunication technologies.

FIG. 1 illustrates a non-limiting example of a wireless communication system 100 which can be used in connection with at least some embodiments of the subject disclosure. In one or more embodiments, system 100 can comprise one or more user equipment UEs $102_1$, $102_2$, referred to collectively as UEs 102, a network node 104 that supports cellular communications in a service area 110, also known as a cell, and communication service provider network(s) 106.

The non-limiting term "user equipment" can refer to any type of device that can communicate with a network node 104 in a cellular or mobile communication system 100. UEs 102 can have one or more antenna panels having vertical and horizontal elements. Examples of UEs 102 comprise target devices, device to device (D2D) UEs, machine type UEs or UEs capable of machine to machine (M2M) communications, personal digital assistants (PDAs), tablets, mobile terminals, smart phones, laptop mounted equipment (LME), universal serial bus (USB) dongles enabled for mobile communications, computers having mobile capabilities, mobile devices such as cellular phones, laptops having laptop embedded equipment (LEE, such as a mobile broadband adapter), tablet computers having mobile broadband adapters, wearable devices, virtual reality (VR) devices, heads-up display (HUD) devices, smart cars, machine-type communication (MTC) devices, augmented reality head mounted displays, and the like. UEs 102 can also comprise IOT devices that communicate wirelessly.

In various embodiments, system 100 comprises communication service provider network(s) 106 serviced by one or more wireless communication network providers. Communication service provider network(s) 106 can comprise a "core network". In example embodiments, UEs 102 can be communicatively coupled to the communication service provider network(s) 106 via network node 104. The network node 104 (e.g., network node device) can communicate with UEs 102, thus providing connectivity between the UEs 102 and the wider cellular network. The UEs 102 can send transmission type recommendation data to the network node 104. The transmission type recommendation data can comprise a recommendation to transmit data via a closed loop multiple input multiple output (MIMO) mode and/or a rank-1 precoder mode.

A network node 104 can have a cabinet and other protected enclosures, computing devices, an antenna mast, and multiple antennas for performing various transmission operations (e.g., MIMO operations) and for directing/steering signal beams. Network node 104 can comprise one or more base station devices which implement features of the network node 104. Network nodes can serve several cells, depending on the configuration and type of antenna. In example embodiments, UEs 102 can send and/or receive communication data via a wireless link to the network node 104. The dashed arrow lines from the network node 104 to the UEs 102 represent downlink (DL) communications to the UEs 102. The solid arrow lines from the UEs 102 to the network node 104 represent uplink (UL) communications.

Communication service provider networks 106 can facilitate providing wireless communication services to UEs 102 via the network node 104 and/or various additional network devices (not shown) included in the one or more communication service provider networks 106. The one or more communication service provider networks 106 can comprise various types of disparate networks, including but not limited to: cellular networks, femto networks, picocell networks, microcell networks, internet protocol (IP) networks Wi-Fi service networks, broadband service network, enterprise networks, cloud-based networks, millimeter wave networks and the like. For example, in at least one implementation, system 100 can be or comprise a large-scale wireless communication network that spans various geographic areas. According to this implementation, the one or more communication service provider networks 106 can be or comprise the wireless communication network and/or various additional devices and components of the wireless communication network (e.g., additional network devices and cell, additional UEs, network server devices, etc.).

The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also comprise wireless link components, such as but not limited to, line-of-sight (LOS) or non-LOS links which can comprise terrestrial air-interfaces or deep space links (e.g., satellite communication links for navigation). Backhaul links 108 can be implemented via a "transport network" in some embodiments. In another embodiment, network node 104 can be part of an integrated access and backhaul network. This may allow easier deployment of a dense network of self-backhauled 5G cells in a more integrated manner by building upon many of the control and data channels/procedures defined for providing access to UEs.

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers, e.g., LTE FDD/TDD, GSM/GERAN, CDMA2000 etc.

For example, system 100 can operate in accordance with any 5G, next generation communication technology, or existing communication technologies, various examples of which are listed supra. In this regard, various features and functionalities of system 100 are applicable where the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G or subsequent generation wireless networking features and functionalities. 5G wireless communication networks are expected to fulfill the demand of exponentially increasing data traffic and to allow people and machines to enjoy gigabit data rates with virtually zero (e.g., single digit millisecond) latency. Compared to 4G, 5G supports more diverse traffic scenarios. For example, in addition to the various types of data communication between conventional UEs (e.g., phones, smartphones, tablets, PCs, televisions, internet enabled televisions, AR/VR head mounted displays (HMDs), etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of 5G networks can comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks can allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The 5G access network can utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the 3GPP and has been in use (including with LTE), is a multi-antenna technique that can improve the spectral efficiency of transmissions, thereby significantly boosting the overall data carrying capacity of wireless systems. The use of MIMO techniques can improve mmWave communications and has been widely recognized as a potentially important component for access networks operating in higher frequencies. MIMO can be used for achieving diversity gain, spatial multiplexing gain and beamforming gain. For these reasons, MIMO systems are an important part of the 3rd and 4th generation wireless systems and are in use in 5G systems.

Figure 2:
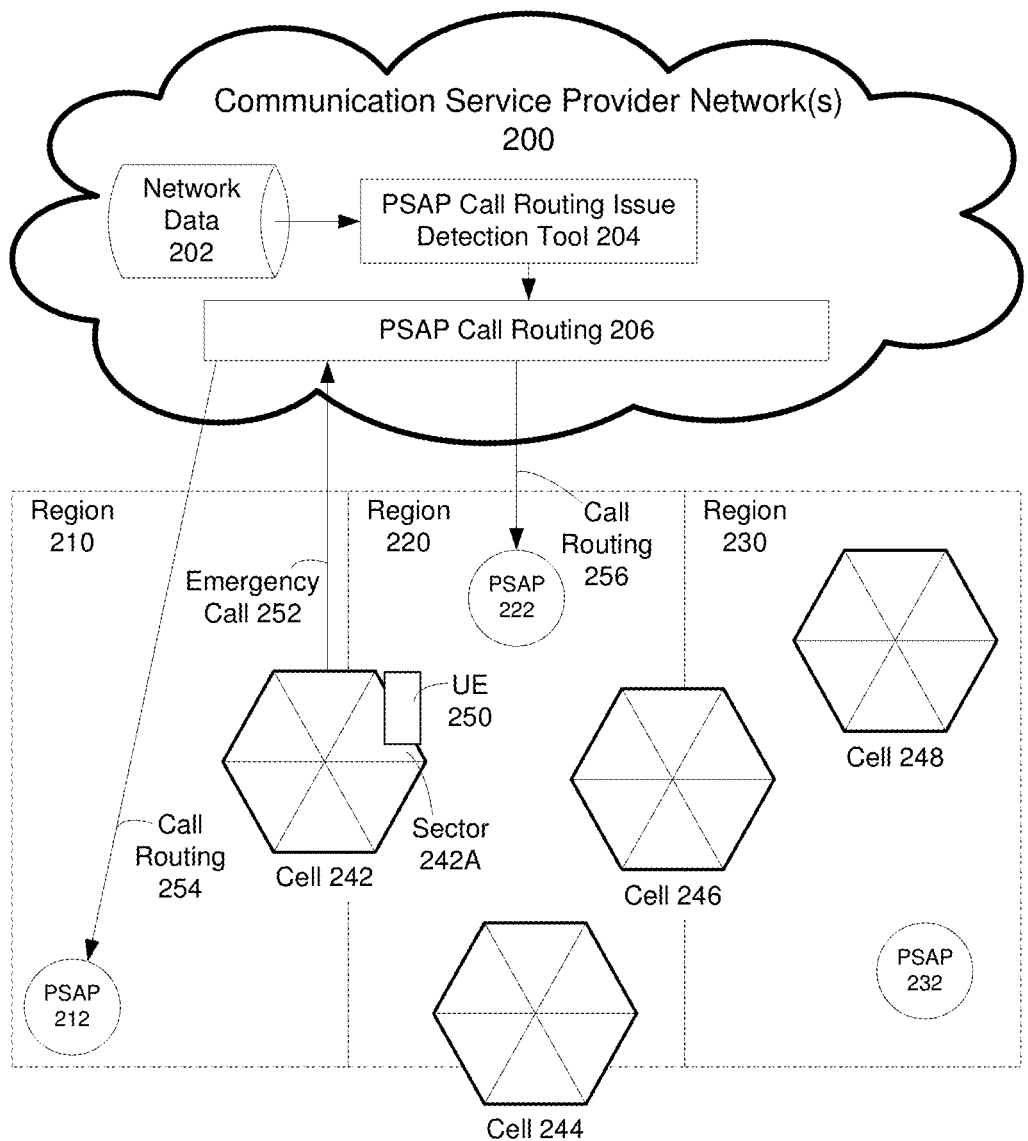
FIG. 2 illustrates an example public service answering point (PSAP) call routing issue detection tool and operations thereof, in accordance with various aspects and embodiments of the subject disclosure.

FIG. 2 illustrates an example PSAP call routing issue detection tool and operations thereof, in accordance with various aspects and embodiments of the subject disclosure. FIG. 2 includes communication service provider network(s) 200 which can implement, e.g., communication service provider network(s) 106 illustrated in FIG. 1. The communication service provider network(s) 200 can include network data 202, PSAP call routing issue detection tool 204, and PSAP call routing 206.

FIG. 2 further includes example PSAP regions 210, 220, and 230. The PSAP regions 210, 220, and 230 represent geographic areas that can include, e.g., user equipment, network nodes, and PSAPs. Region 210 includes PSAP 212, which can be responsible for responding to emergency calls within region 210. Region 220 includes PSAP 222, which can be responsible for responding to emergency calls within region 220. Region 230 includes PSAP 232, which can be responsible for responding to emergency calls within region 230.

Example cells within the regions 210, 220, and 230 include cells 242, 244, 246, and 248. Each cell 242, 244, 246, and 248 can be implemented via a network node such as network node 104 introduced in FIG. 1. Furthermore, each cell 242, 244, 246, and 248 can comprise multiple cell sectors, such as the example cell sector 242A of cell 242. The service area of each cell sector is located within a region 210, 220, and 230, or may span across a region boundary and can therefore be located in multiple regions.

FIG. 2 further includes an example UE 250. The UE 250 is located in region 220 and the UE 250 can be served by cell sector 242A. Therefore, when the UE 250 places an emergency call 252, the PSAP call routing 206 can route the emergency call 252 to a PSAP associated with cell sector 242A. A first example call routing 254 is illustrated, in which the emergency call 254 is routed to PSAP 212 in region 210. A second example call routing 256 is also illustrated, in which the emergency call 254 is routed to PSAP 222 in region 220.

FIG. 2 illustrates a scenario wherein a network node that implements the cell 242 is located within region 210 (at the center of the cell 242), however, the service area of a cell sector 242A mostly overlaps a different region, namely region 220. PSAP call routing 206 could incorrectly be configured to route emergency call 252 to the PSAP 212 that serves the region 210 in which the cell 242 is located. However, call routing 254 would be inefficient for emergency call 252, because UE 252 is located in region 220, and furthermore, UE 250 is closer to PSAP 222 than to PSAP 212. Therefore, call routing 256 is the more efficient call routing for emergency call 252.

In some embodiments, the PSAP call routing issue detection tool 204 can be configured to detect issues such as the above scenario presented in FIG. 2, as well as other PSAP call routing issues described herein. The PSAP call routing issue detection tool 204 can present analysis data, e.g., via a user interface, for further analysis by network engineers. The analysis data can comprise, e.g., an identification of a cell sector such as 242A for which emergency calls may be incorrectly routed, e.g., by call routing 254, as well as further analysis data such as cell sector 242A service area boundaries, PSAP region 210, 220 boundaries, geographical information, call routing history information, and other analysis data. Network engineers can use the analysis data to determine whether to re-map a sector, e.g., sector 242A to a different PSAP, e.g., to PSAP 222, so that PSAP call routing 206 can route future emergency calls processed via sector 242A to PSAP 222. The PSAP call routing issue detection tool 204 can be configured to enable reconfiguration of PSAP call routing 206 according to network engineer inputs.

In some embodiments, the PSAP call routing issue detection tool 204 can furthermore be configured to suggest a different PSAP, e.g., PSAP 222, for emergency calls handled via a given sector 242A. Network engineers can be presented with analysis data which identifies a potential problem/issue in PSAP call routing, and network engineers can furthermore be presented with a suggestion which identifies a potential solution, namely a new PSAP 222 for use in call routing of emergency calls such as 252 via a given sector 242A. With the benefit of the analysis data and the suggestion supplied by the PSAP call routing issue detection tool 204, network engineers can determine whether to adopt the suggestion. The PSAP call routing issue detection tool 204 can be configured to enable corresponding reconfiguration of PSAP call routing 206.

In a further embodiment, the PSAP call routing issue detection tool 204 can be configured to automatically reconfigure PSAP call routing 206 according to generated suggestions, e.g., by automatically reconfiguring PSAP call routing 206 to route emergency calls via a given sector 242A to a different PSAP 222. Such embodiments need not wait for network engineer input and instructions. Instead, such embodiments can automatically reconfigure PSAP call routing 206 and can optionally present analysis data enabling network engineer review of detected issues and corresponding reconfigurations of PSAP call routing 206 that were automatically performed to address the detected issues.

Figure 3:
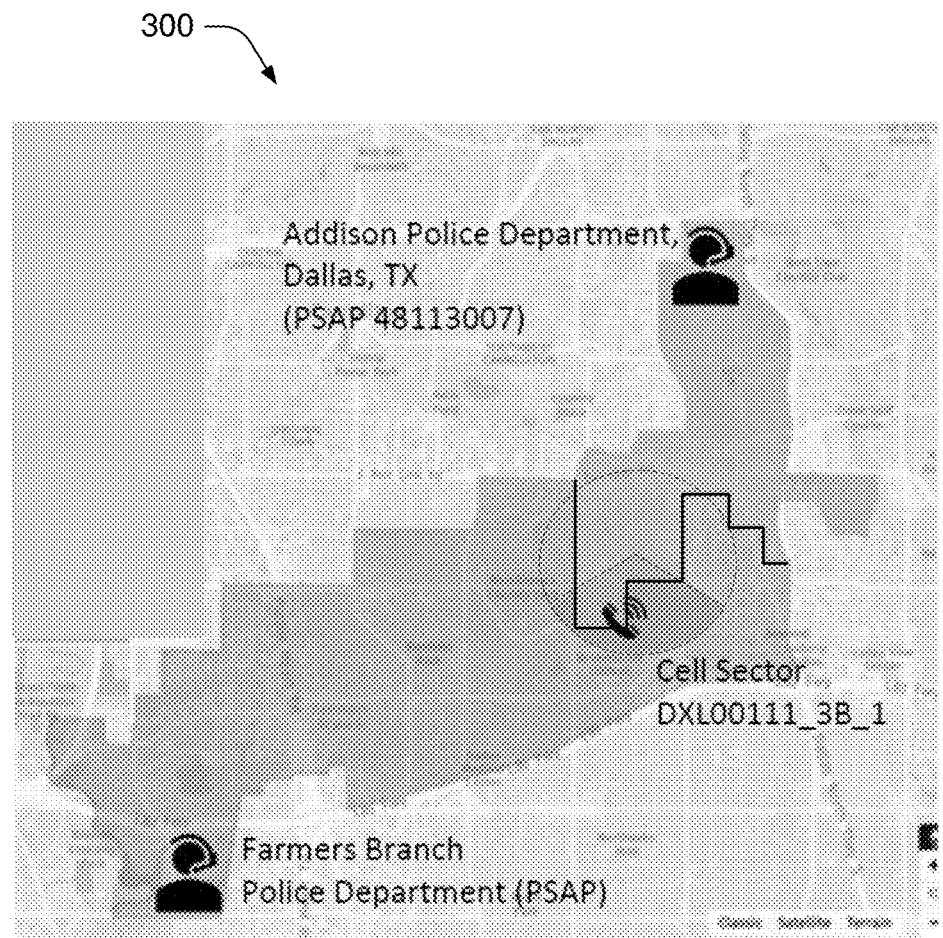
FIG. 3 illustrates an example map view comprising PSAP routing analysis data, in accordance with various aspects and embodiments of the subject disclosure.

FIG. 3 illustrates an example map view comprising PSAP routing analysis data, in accordance with various aspects and embodiments of the subject disclosure. The example map view 300 includes a map with geographical features such as roads, parks and structures. The map view 300 further includes an indication of a location of a first PSAP, namely, the Addison Police Department, and an indication of a location of a second PSAP, namely, the Farmers Branch Police Department. The map view 300 further includes an indication of a first region served by the Addison Police Department, including boundaries of the first region, and a second region served by the Farmers Branch Police Department, including boundaries of the second region. The map view 300 further includes an indication of a region served by a cell sector, namely, cell sector DXL00111_3B_1. The map view 300 further includes an indication, e.g., the telephone icon, of a location of an example UE associated with an emergency call.

In some embodiments, a map view 300 such as illustrated in FIG. 3 can be provided by a PSAP call routing issue detection tool 204, e.g., via a user interface. The map view 300 provides analysis data for review by network engineers to assist with determinations regarding whether emergency calls via a cell sector, e.g., cell sector DXL00111_3B_1, should be routed to a different PSAP.

As can be seen in FIG. 3, the region covered by cell sector DXL00111_3B_1 is mostly within the Farmers Branch Police Department PSAP region. However, the network node that supports the cell sector DXL00111_3B_1 appears to be located in the Addison Police Department PSAP region. Moreover, the region covered by cell sector DXL00111_3B_1 appears to be a shorter distance to the Addison Police Department PSAP location than to the Farmers Branch Police Department PSAP location. Also, a large road or highway appears to link the Farmers Branch Police Department PSAP location with the region covered by cell sector DXL00111_3B_1. These examples and other analysis data can be involved in emergency call routing determinations. Analysis data can be presented by a PSAP call routing issue detection tool 204 to assist in emergency call routing and re-routing determinations.

The analysis data presented via map view 300, as well as further analysis data such as relative loads on the different PSAPS, UE location distributions, PSAP capacity, traffic patterns, and histories of such analysis data, as well as other analysis data described herein, can be presented by a PSAP call routing issue detection tool 204 for analysis and determinations regarding routing of emergency calls from a given cell sector.

Figure 4:
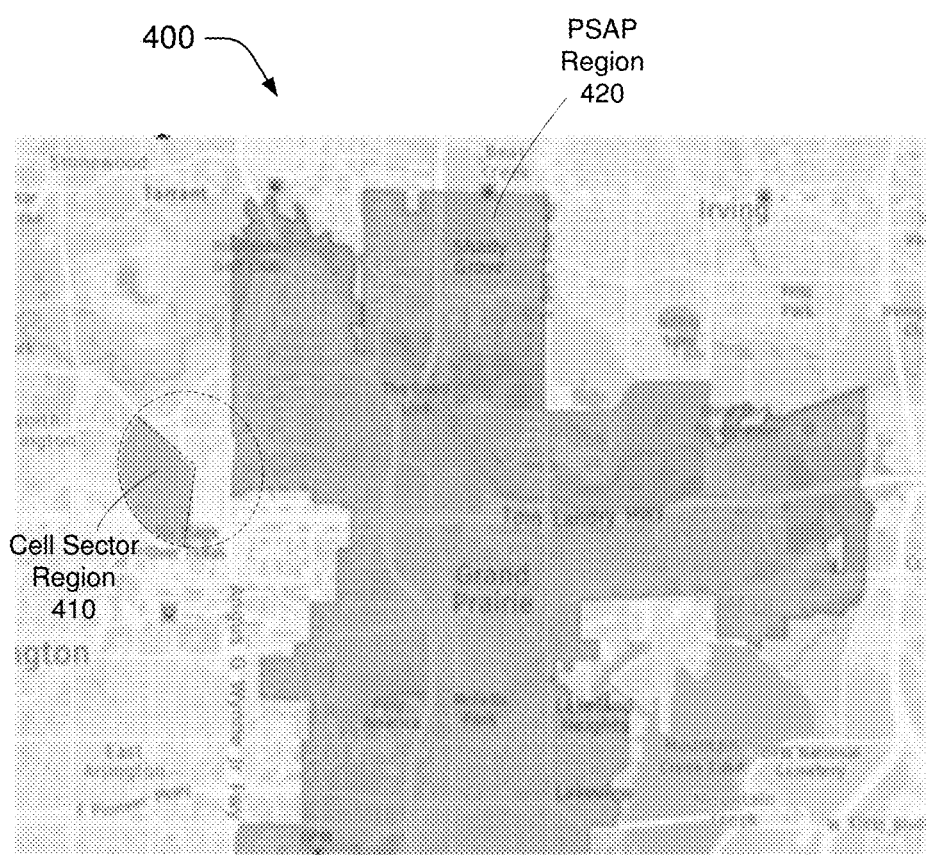
FIG. 4 illustrates another example map view comprising PSAP routing analysis data, in accordance with various aspects and embodiments of the subject disclosure.

FIG. 4 illustrates another example map view comprising PSAP routing analysis data, in accordance with various aspects and embodiments of the subject disclosure. The example map view 400 includes a map with geographical features such as roads, parks and structures. The map view 400 further includes an indication of a PSAP region 420, including boundaries of the PSAP region 420. The map view 400 further includes an indication of a cell sector region 410 served by a cell sector. In FIG. 4, the cell sector region 410 lies entirely outside of the PSAP region 420.

The map view 400 provides another example map view that can be presented by a PSAP call routing issue detection tool 204 in order to present analysis data. In some embodiments, the PSAP call routing issue detection tool 204 can be configured to detect issues, also referred to herein as problems or anomalies in PSAP call routing data, and the PSAP call routing issue detection tool 204 can present analysis data in response to a detected anomaly. FIG. 3 and FIG. 4 both illustrate example anomalies that can be detected by a PSAP call routing issue detection tool 204. FIG. 3 illustrates an anomaly wherein portions of a cell sector region are in different PSAP regions. FIG. 4 illustrates an anomaly wherein an entire cell sector region 410 is not included in a PSAP region 420 associated with a PSAP to which calls from cell sector region 410 may currently be routed. A wide variety of other anomaly types can be detected by embodiments of this disclosure. In general, an anomaly can be identified when emergency calls can potentially be routed to a different PSAP having a more efficient response than the response achievable via a current PSAP call routing.

In some embodiments, the location of the cell sector region 410 can be determined based on historic call data, e.g., data associated with respective locations of UE calls routed via a cellular communication network to respective PSAPS. By logging locations of UEs when calls are made, as well as cell sectors of the calls, cell sector regions can be estimated. In some instances, cell sector regions can be larger, smaller, or differently shaped than would be estimated by modeling alone. A more accurately measured cell sector region 410 can be used by the PSAP call routing issue detection tool 204 for improved anomaly detection.

Figure 5:
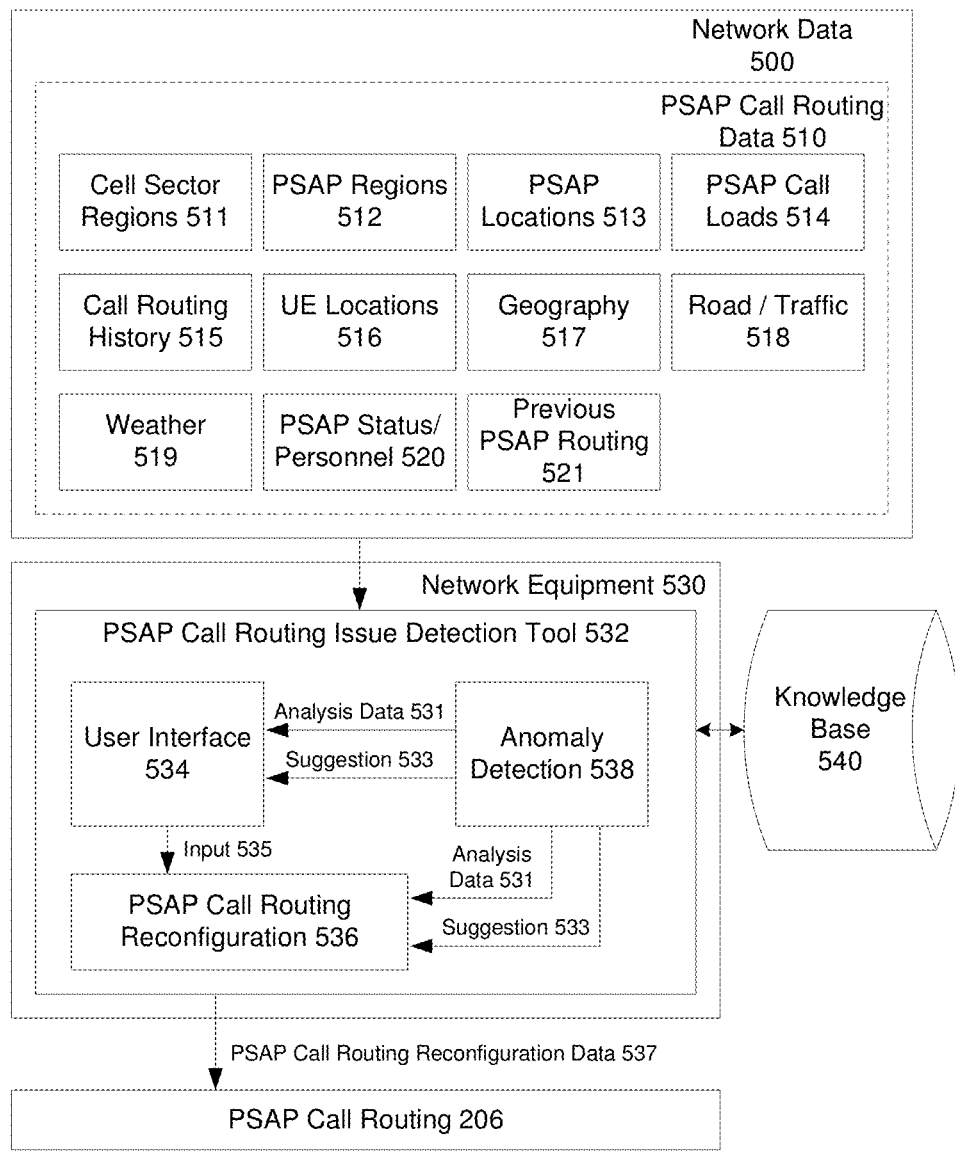
FIG. 5 illustrates an example architecture of a PSAP call routing issue detection tool, in accordance with various aspects and embodiments of the subject disclosure.

FIG. 5 illustrates an example architecture of a PSAP call routing issue detection tool, in accordance with various aspects and embodiments of the subject disclosure. FIG. 5 includes network data 500, network equipment 530, knowledge base 540 and PSAP call routing 206. The network data 500 can implement the network data 202 introduced in FIG. 2, the network equipment 530 can implement equipment of the communication service provider network(s) 200 introduced in FIG. 2, and PSAP call routing 206 was previously introduced in FIG. 2.

The network data 500 can comprise, inter alia, PSAP call routing data 510. PSAP call routing data 510 can include, for example, cell sector regions 511, PSAP regions 512, PSAP locations 513, PSAP call loads 514, call routing history 515, UE locations 516, geography 517, road/traffic 518, weather 519, PSAP status/personnel 520, and/or previous PSAP routing 521.

The network equipment 530 can comprise PSAP call routing issue detection tool 532, which can implement the PSAP call routing issue detection tool 204 introduced in FIG. 2. The PSAP call routing issue detection tool 532 can comprise user interface 534, PSAP call routing reconfiguration 536, and anomaly detection 538.

In example operations according to FIG. 5, detection operations performed by the PSAP call routing issue detection tool 532 can be periodic, such as daily, weekly or monthly, or can be triggered by certain events, such as cellular network updates resulting in new cell sector regions 511, or PSAP region updates resulting in new PSAP regions 512. The anomaly detection 538 can be configured to perform anomaly detection using the PSAP cell routing data 510 and/or the knowledge base 540. In an example anomaly detection operation, anomaly detection 538 can, e.g., scan for a cell sector region included in cell sector regions 511 which has emergency call routing to a PSAP region of PSAP region 512, however, the cell sector region is partly or entirely outside of the PSAP, e.g., as illustrated in FIG. 3 and FIG. 4. In various alternative embodiments, any of the data 511-521 can be used to determine anomalies wherein a cell sector has emergency calls incorrectly routed to a PSAP region, wherein "incorrectly routed" can be determined by the availability of a different PSAP region which could more efficiently respond to calls originating from the cell sector.

In response to detection of an anomaly, in some embodiments, the anomaly detection 538 can be configured to generate analysis data 531 and to provide the analysis data 531 to the user interface 534. The analysis data 531 can comprise, e.g., a map view such as illustrated in FIG. 3 and FIG. 4, or any other view of analysis data. The anomaly detection 538 can furthermore optionally provide a suggestion 533, e.g., a suggested different PSAP to which emergency calls from a cell sector can be more efficiently routed. A network engineer can review the analysis data 531 and the suggestion 533, and can supply an input 535, e.g., an identification of a PSAP to which emergency calls from a cell sector can be routed. The input 535 can be supplied to PSAP call routing reconfiguration 536, and the PSAP call routing reconfiguration 536 can be configured to apply the input 535 by providing corresponding PSAP call routing reconfiguration data 537 to the PSAP call routing 206. The PSAP call routing reconfiguration data 537 can be operable to reconfigure a cellular network to route emergency calls according the input 535.

In another embodiment, the anomaly detection 538 can supply the analysis data 531 and/or the suggestion 533 directly to the PSAP call routing reconfiguration 536, without necessarily receiving network engineer review and input 535 via the user interface 534. The PSAP call routing reconfiguration 536 can be configured to automatically implement the suggestion 533 by sending PSAP call routing reconfiguration data 537 which incorporates the suggestion 533 to the PSAP call routing 206. Automatically implemented suggestions can be later reviewed and optionally reversed or modified by network engineers from the user interface 534.

The anomaly detection 538 can optionally be configured to use machine learning to improve and refine its operations, including, e.g., anomaly detection and suggestion identification. In a machine learning embodiment, the PSAP call routing data 510 can be stored in knowledge base 540, along with any other useful data. When a network engineer modifies a PSAP call routing, e.g., using input 535, the knowledge base 540 can be updated by reinforcing/assigning heavier weight to associated data to identify future anomalies. In contrast, when a network engineer does not modify a PSAP call routing associated with a detected anomaly, the knowledge base 540 can be updated by assigning lighter weights to data associated with the "false positive" anomaly.

Figure 6:
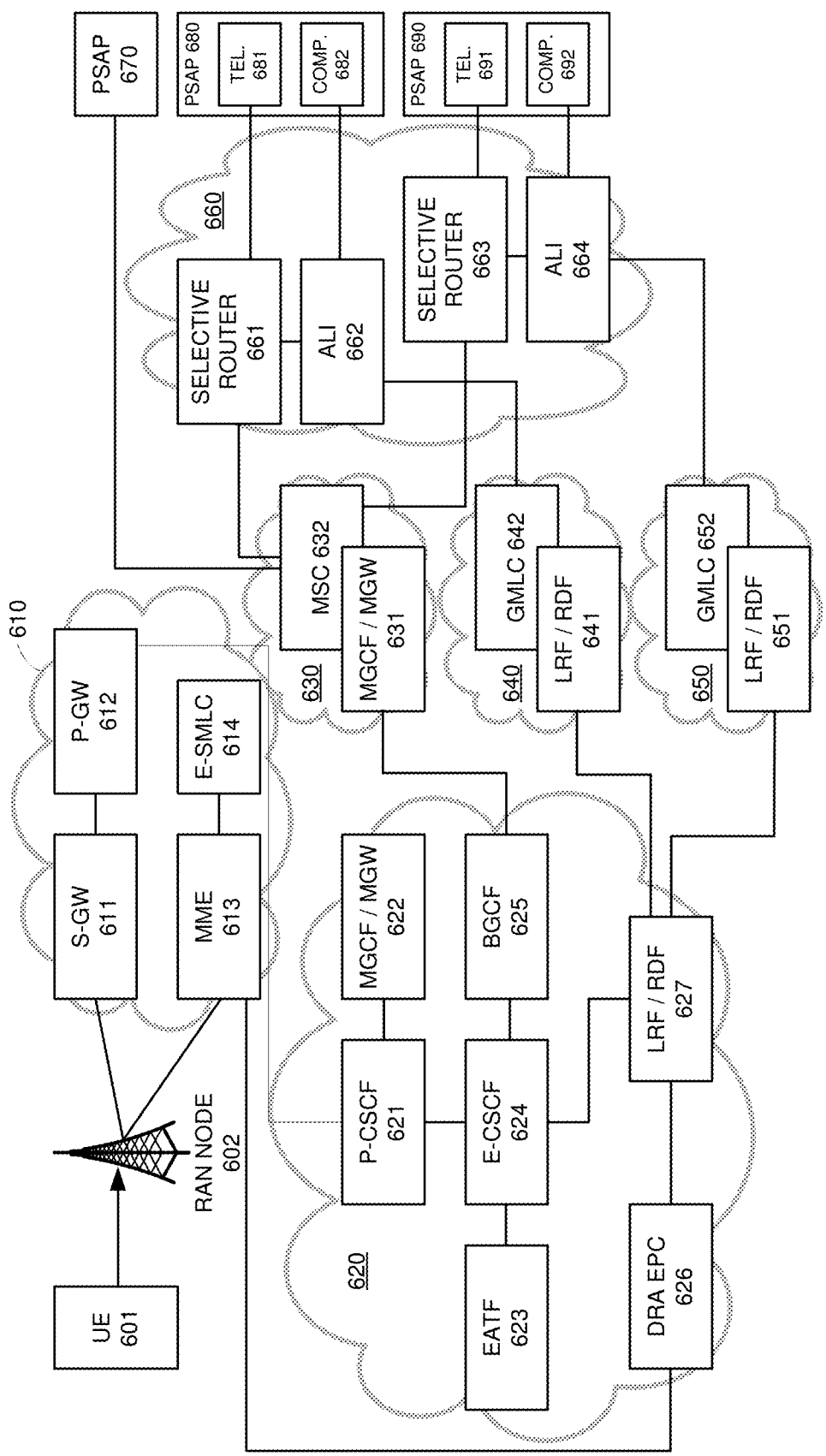
FIG. 6 illustrates example network elements involved in PSAP call routing, in accordance with various aspects and embodiments of the subject disclosure.

FIG. 6 illustrates example network elements involved in PSAP call routing, in accordance with various aspects and embodiments of the subject disclosure. FIG. 6 includes a UE 601, a RAN node 602, a first group of network functions 610, a second group of network functions 620, a third group of network functions 630, a fourth group of network functions 640, a fifth group of network functions 650, a sixth group of network functions 660, a PSAP 670, a PSAP 680, and a PSAP 690. Any of the various example network functions illustrated in FIG. 6 can be involved in PSAP call routing 206. The PSAP call routing reconfiguration data 537 illustrated in FIG. 5 can, e.g., include reconfiguration data for the network functions illustrated in FIG. 6. The PSAP call routing reconfiguration 536 can be configured to generate PSAP call routing reconfiguration data 537 that reconfigures the network functions illustrated in FIG. 6.

The first group of network functions 610 can comprise, e.g., an LTE evolved packet system (EPS). Example network functions 610 include a serving gateway (S-GW) 611, a packet data network gateway (P-GW) 612, a mobility management entity (MME) 613, and an enhanced serving mobile location center (E-SMLC) 614.

The second group of network functions 620 can comprise, e.g., an IP multimedia subsystem (IMS). Example network functions 620 include a proxy call session control function (P-CSCF) 621, a media gateway control function/media gateway (MGCF/MGW) 622, an emergency access transfer function (EATF) 623, an emergency call session control function (E-CSCF) 624, a breakout gateway control function (BGCF) 625, a diameter routing agent for evolved packet core (DRA EPC) 626, and a location retrieval function/routing determination function (LRF/RDF) 627.

The third group of network functions 630 can comprise, e.g., a universal mobile telecommunications service (UMTS). Example network functions 630 include media gateway control function/media gateway (MGCF/MGW) 631 and mobile switching center (MSC) 632.

The fourth group of network functions 640 can comprise, e.g., a telecommunication system (TCS). Example network functions 640 include LRF/RDF 641 and gateway mobile location center (GMLC) 642. The fifth group of network functions 650 can comprise, e.g., functions of a third party data provider. Example network functions 650 include LRF/RDF 651 and GMLC 652.

The sixth group of network functions 660 can comprise, e.g., a public switched telephone network (PSTN). Example network functions 660 include selective router 661, automatic location information (ALI) 662, selective router 663, and ALI 664.

The example PSAP 680 can comprise a telephone response unit 681 and a computer response unit 682. The example PSAP 690 can comprise a telephone response unit 691 and a computer response unit 692.

Aspects of this disclosure relate to both 911 response technologies and location based service (LBS) platforms. To improve 911 call routing efficiency, embodiments can accurately measure the efficiency of call routing when the 911 calls initiated from UEs within a cell site sector radius. Smart routing can be implemented to improve call routing to 911 call centers by intelligently picking the right PSAPs using Artificial Intelligence (AI) and Machine Learning (ML) methods. AI and ML methods can apply user locations, cell site locations, physical area coverages of cell site sectors and the 911 call loads on each PSAP under a cell site sector.

AI/ML based solutions can rely on real-time UE locations and cell site measurement data collected from cell sites to determine the right (most efficient) PSAP to forward enhanced 911 (E911) calls. Cell radius coverage data aggregated with UE location data can be plotted on a map tool such as illustrated in FIG. 3, with appropriate filter capabilities to allow for troubleshooting. Network engineers can use the map to determine E911 call routing efficiency of PSAPs in targeted regions. When an anomaly is determined from the tool, the cell site data from the region containing ECGI (E-UTRAN cell global identifier), and associated PSAP call counts can be aggregated and passed on to an ML model that can predict and propose the right PSAP to route the E911 calls. Physical area coverages of cell sites, UE locations, and the PSAP load based on E911 call counts can be considered by an example ML model. Furthermore, 5G introduces MIMO cells that facilitate determining UE indoor locations and building levels, which can help a PSAP call center when dispatching emergency personnel.

Embodiments of this disclosure can determine 911 call routing efficiency and reduce response times by utilizing location based routing and by mapping physical cell site sector coverages to PSAP regions. Embodiments can furthermore provide future location-based services based on the location of the UE.

In an example according to this disclosure, a PSAP can comprise a call center where wireless 911 emergency calls and texts are terminated (received and answered). PSAPs can comprise, e.g., local city police stations, fire brigades or ambulance centers. Wireless service providers are mandated by the federal communications commission (FCC) to correctly route wireless 911 calls to a nearest PSAP agency based on a caller's real-time location and the coverage area defined by the sector serving the 911 call. Local government agencies (counties, townships, cities) notify wireless service providers of the geographical regions that each given PSAP within their jurisdiction covers, along with the wireless E911 FCC regulatory compliance level that is supported within each PSAP. Some PSAPs simply support receiving 911 calls (phase 0 of the wireless 911 implementations), while others can collect and use a wireless caller's call back number and cell site/sector address (phase 1), whilst others are able to also receive and leverage the wireless device's real-time location information as estimated by the service provider. Wireless service providers are responsible for routing E911 calls to the correct PSAP according to the information provided by the local government agencies, and the network is responsible for passing on the appropriate information about a caller's callback number and location depending on the PSAP capabilities. For real-time location enabled PSAPs, a caller's location information must be received by that PSAP within 30 seconds from the beginning of a 911 call.

For wireless calls, a caller's latitude and longitude can be determined using either a UE based solution such as assisted GPS (AGPS) or a network-based solution calculated by a service mobile location center (SMLC) network element. In either case, a caller's latitude and longitude values can be sent through the SMLC and onto the wireless service provider's external gateway mobile location center (GMLC) provider which in turn forwards the caller's location to the ALI (automatic location identification) database that services the PSAP. The PSAP can query the ALI after receiving the call and may request location updates during the call, known as rebids.

The caller's latitude and longitude are vital to first responders actively responding to the caller, the GMLC node can use the disclosed AI/ML services to determine the accurate PSAP appropriate for this call. In some embodiments, boosting ensemble techniques can be used in the ML model training; however, the model can leverage various other algorithms to improve the accuracy. The AI/ML model method disclosed herein and used to perform and improve PSAP routing can be hosted as a separate service taking requests, irrespective of network technology (3G/4G/5G or future radio access networks).

If a device location is unknown when an emergency call is made, a GMLC node can predetermine which PSAP should receive the emergency call based on the call's associated sector's radio frequency (RF) configuration. This configuration can be established during a sector's provisioning process before the sector is turned on-air or undergoes new reconfigurations. The sector's RF configuration describes the physical area of coverage and includes the antenna's latitude and longitude, the direction that the antenna faces, called the azimuth, as well as other RF parameters.

In some embodiments, information used in connection with this disclosure can be provided via an ACD (add, change, delete) application programming interface (API), which can pull RF configurations from various data sources. GMLC network nodes can pass the information to a PSAP and the PSAP can dispatch the necessary emergency services to the caller location.

In some embodiments, AI/ML solutions according to this disclosure can offer location-based services. Cell site area coverage and UE z-axis building level data can help provide tailored services to emergency call centers to reach victims more accurately inside a building. Furthermore, geo-fence based location services can be provided to businesses, allowing customers to get location based non-emergency services.

Figure 7:
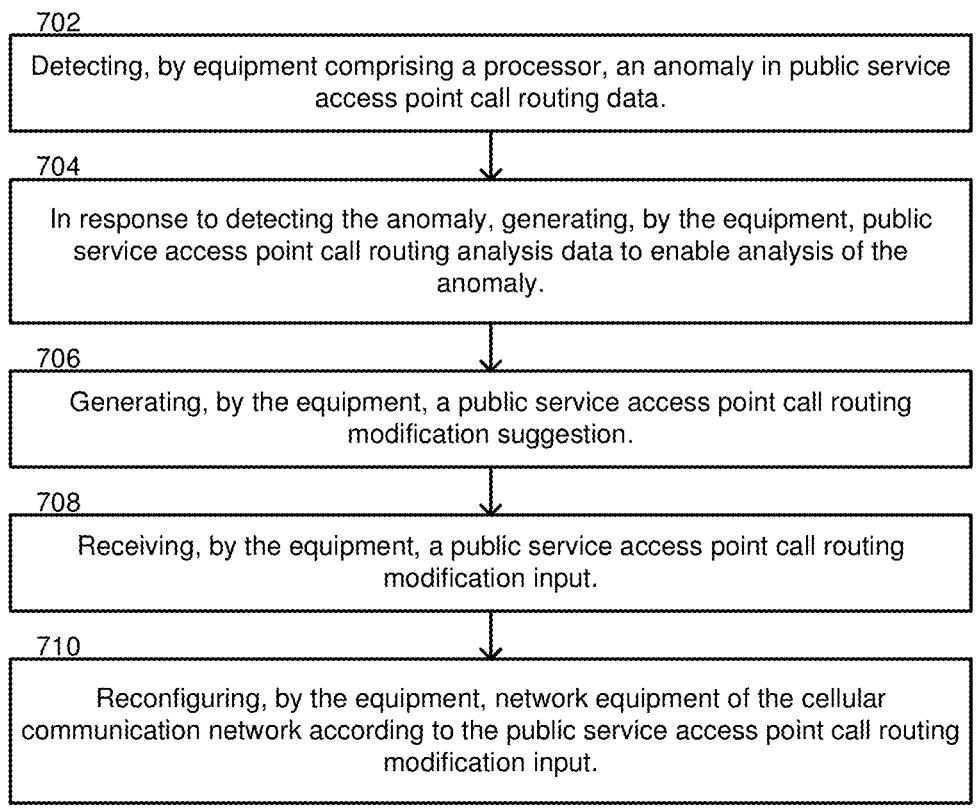
FIG. 7 is a flow diagram representing example operations of network equipment comprising a PSAP call routing issue detection tool, in accordance with various aspects and embodiments of the subject disclosure.

FIG. 7 is a flow diagram representing example operations of network equipment comprising a PSAP call routing issue detection tool, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 7 can be performed, for example, by network equipment, e.g., network equipment 530, comprising a PSAP call routing issue detection tool 532 illustrated in FIG. 5, or a PSAP call routing issue detection tool 204 such as illustrated in FIG. 2. Example operation 702 comprises detecting, by equipment 530 comprising a processor, an anomaly in PSAP call routing data 510. The PSAP call routing data 510 can comprise, e.g., data associated with respective UE calls, such as emergency call 252 and others, routed via a cellular communication network 200 to respective PSAPs 212, 222, 232. The respective UE calls 252 can comprise emergency calls to emergency response centers. The anomaly can indicate a UE call 252 of the respective UE calls was routed via the cellular communication network 200 to a first PSAP 212 of the respective PSAPs 212, 222, 232, the first PSAP having a first efficiency for the UE call 252, wherein the first efficiency is lower than a second efficiency associated with a second PSAP 222 of the respective PSAPs 212, 222, 232.

In some embodiments, the anomaly detected at 702 can be based on load data, e.g., PSAP call loads 514, representing a first call load at the first PSAP 212 and a second call load at the second PSAP 222. In some embodiments, the anomaly detected at 702 can be based on call re-routing data, e.g., call routing history 515, representing call re-routing of the UE call 252 from the first PSAP 212 to the second PSAP 222. In some embodiments, the anomaly detected at 702 can be based on distance comparisons, such as may be determined from PSAP locations 513 and UE locations 516. A first location of the first PSAP 212, a second location of the second PSAP 222, and a third location of UE 250 associated with the UE call 252, can be used to compare a first distance from the first location to the third location and a second distance from the second location to the third location. The anomaly can be detected when the first distance is longer than the second distance.

Operation 704 comprises, in response to detecting the anomaly, generating, by the equipment 530, PSAP call routing analysis data 531 to enable analysis of the anomaly. The PSAP call routing analysis data 531 can comprise, e.g., a map view similar to the views illustrated in FIG. 3 or FIG. 4. The map view can comprise, e.g., a map, a first indication on the map of a first PSAP location associated with the first PSAP 212, a second indication on the map of a second PSAP location associated with the second PSAP 222, a third indication on the map of a location of a UE 250 associated with the UE call 252, and/or a fourth indication on the map of a cell sector 242A coverage region associated with a cell sector 242A of the cellular communication network 200, wherein the cell sector 242A processed the UE call 252. In some embodiments, the map view can comprise, e.g., an indication on the map of a first PSAP region 210 associated with the first PSAP 212 and/or an indication on the map of a second PSAP region 220 associated with the second PSAP 222.

Operation 706 comprises generating, by the equipment 530, a PSAP call routing modification suggestion 533 comprising an identification of the second PSAP 222. Operation 708 comprises receiving, by the equipment 530, a PSAP call routing modification input 535. Operation 710 comprises reconfiguring, by the equipment 530, network equipment of the cellular communication network 200 according to the PSAP call routing modification input 535, to thereby to route future PSAP calls that originate proximal to a location of UE 250 associated with the UE call 252 to the second PSAP 222.

Figure 8:
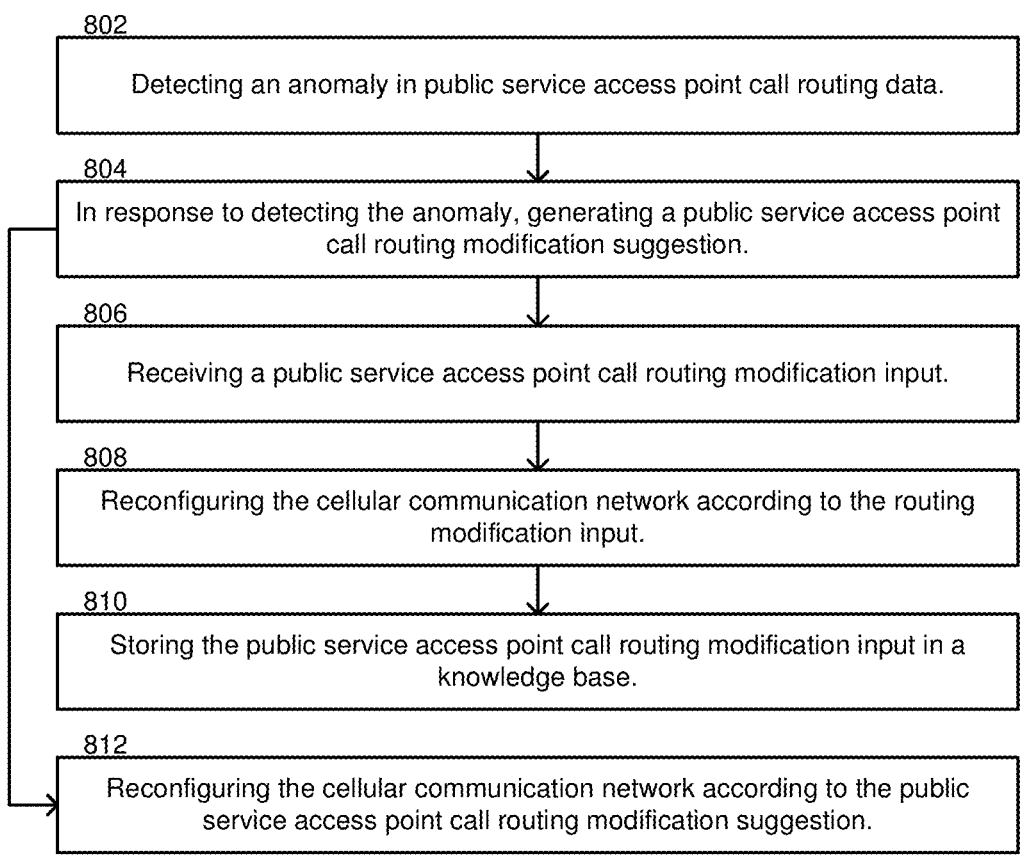
FIG. 8 is a flow diagram representing another set of example operations of network equipment comprising a PSAP call routing issue detection tool, in accordance with various aspects and embodiments of the subject disclosure.

FIG. 8 is a flow diagram representing another set of example operations of network equipment comprising a PSAP call routing issue detection tool, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 8 can be performed, for example, by network equipment, e.g., network equipment 530, comprising a PSAP call routing issue detection tool 532 illustrated in FIG. 5, or a PSAP call routing issue detection tool 204 such as illustrated in FIG. 2. Example operation 802 comprises detecting an anomaly in PSAP call routing data 510. The PSAP call routing data 510 can comprise, e.g., data associated with respective UE calls, such as emergency call 252 and others, routed via a cellular communication network 200 to respective PSAPs 212, 222, 232.

The anomaly detected at 802 can indicate a UE call 252 of the respective UE calls was routed via the cellular communication network 200 to a first PSAP 212 of the respective PSAPs 212, 222, 232, the first PSAP having a first efficiency for the UE call 252, wherein the first efficiency is lower than a second efficiency associated with a second PSAP 222 of the respective PSAPs 212, 222, 232. For example, the anomaly can be based on a cell sector 242A coverage region associated with a cell sector 242A of the cellular communication network 200, wherein the cell sector 242A processed the UE call 252, and wherein the cell sector 242A comprises a first portion within a first boundary associated with the first PSAP 212 and a second portion within a second boundary associated with the second PSAP 222.

Operation 804 comprises, in response to detecting the anomaly, generating a PSAP call routing modification suggestion 533 comprising an identification of the second PSAP 222. Operation 806 comprises receiving a PSAP call routing modification input 535. Operation 808 comprises reconfiguring the cellular communication network 200 according to the routing modification input 535, to thereby route future PSAP calls that originate proximal to a location of UE 250 associated with the UE call 252 to the second PSAP 222. Operation 810 comprises storing the PSAP call routing modification input 535 in a knowledge base 540 adapted for use in connection with a future identification of the second PSAP 222 in response to a future anomaly.

Operation 812 is illustrated as an alternative to operations 806-810. Operation 812 comprises reconfiguring the cellular communication network 200 according to the PSAP call routing modification suggestion 533, to thereby to route future PSAP calls that originate proximal to a location of a UE 250 associated with the UE call 252 to the second PSAP 222. Operation 812 can comprise automatically reconfiguring the cellular communication network 200, without network engineer review of the analysis data 531 or suggestion 533.

Figure 9:
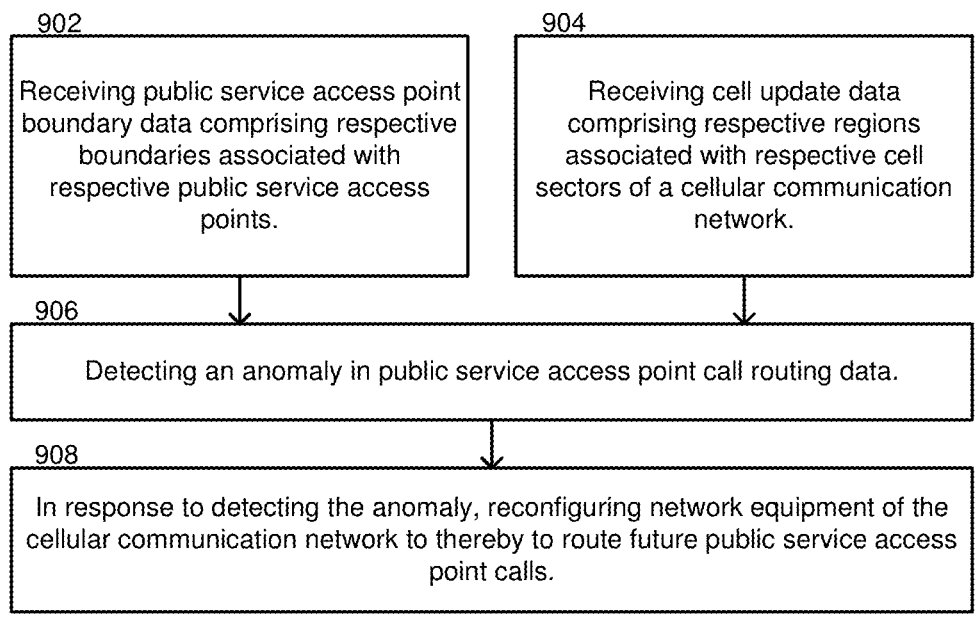
FIG. 9 is a flow diagram representing another set of example operations of network equipment comprising a PSAP call routing issue detection tool, in accordance with various aspects and embodiments of the subject disclosure.

FIG. 9 is a flow diagram representing another set of example operations of network equipment comprising a PSAP call routing issue detection tool, in accordance with various aspects and embodiments of the subject disclosure. The illustrated blocks can represent actions performed in a method, functional components of a computing device, or instructions implemented in a machine-readable storage medium executable by a processor. While the operations are illustrated in an example sequence, the operations can be eliminated, combined, or re-ordered in some embodiments.

The operations illustrated in FIG. 9 can be performed, for example, by network equipment, e.g., network equipment 530, comprising a PSAP call routing issue detection tool 532 illustrated in FIG. 5, or a PSAP call routing issue detection tool 204 such as illustrated in FIG. 2. Example operation 902 comprises receiving PSAP boundary data, e.g., PSAP regions 512, comprising respective boundaries associated with the respective PSAPs. Example operation 904 comprises receiving cell update data, e.g., cell sector regions 511, comprising respective regions associated with respective cell sectors of a cellular communication network.

Operation 906 can optionally be performed in response to operation 902 or 904. Operation 906 comprises detecting an anomaly in PSAP call routing data 510. The PSAP call routing data 510 can comprise data associated with respective UE calls, such as emergency call 252 and others, routed via a cellular communication network 200 to respective PSAPs 212, 222, 232. As illustrated in FIG. 5, the PSAP call routing data 510 can optionally further comprise cell sector data 511 representing coverage areas of cell sectors associated with the respective UE calls, UE location data 516 representing locations of UEs associated with the respective UE calls, and PSAP load data 514 representing call loads at the respective PSAPs 212, 222, 232.

The anomaly detected at operation 906 can indicate, e.g. a UE call 252 of the respective UE calls was routed via the cellular communication network 200 to a first PSAP 212 of the respective PSAPs 212, 222, 232, the first PSAP 212 having a first efficiency for the UE call 252, wherein the first efficiency is lower than a second efficiency associated with a second PSAP 222 of the respective PSAPs 212, 222, 232.

The anomaly can optionally be based on, e.g., a first location of the first PSAP 212, a second location of the second PSAP 222, and a third location of the UE 250 associated with the UE call 252. The anomaly can result when a first distance from the first location to the third location is longer than a second distance from the second location to the third location.

Operation 908 can comprise, in response to detecting the anomaly, reconfiguring network equipment (such as PSAP call routing 206) of the cellular communication network 200 to thereby to route future PSAP calls that originate proximal to a location of the UE 250 associated with the UE call 252 to the second PSAP 222. Reconfiguring the network equipment 206 of the cellular communication network 200 can optionally be performed automatically without input from operators and can comprise, e.g., accessing a knowledge base 240 comprising previously detected anomalies and previous PSAP call routing modification inputs 535 responsive to the previously detected anomalies.

Figure 10:
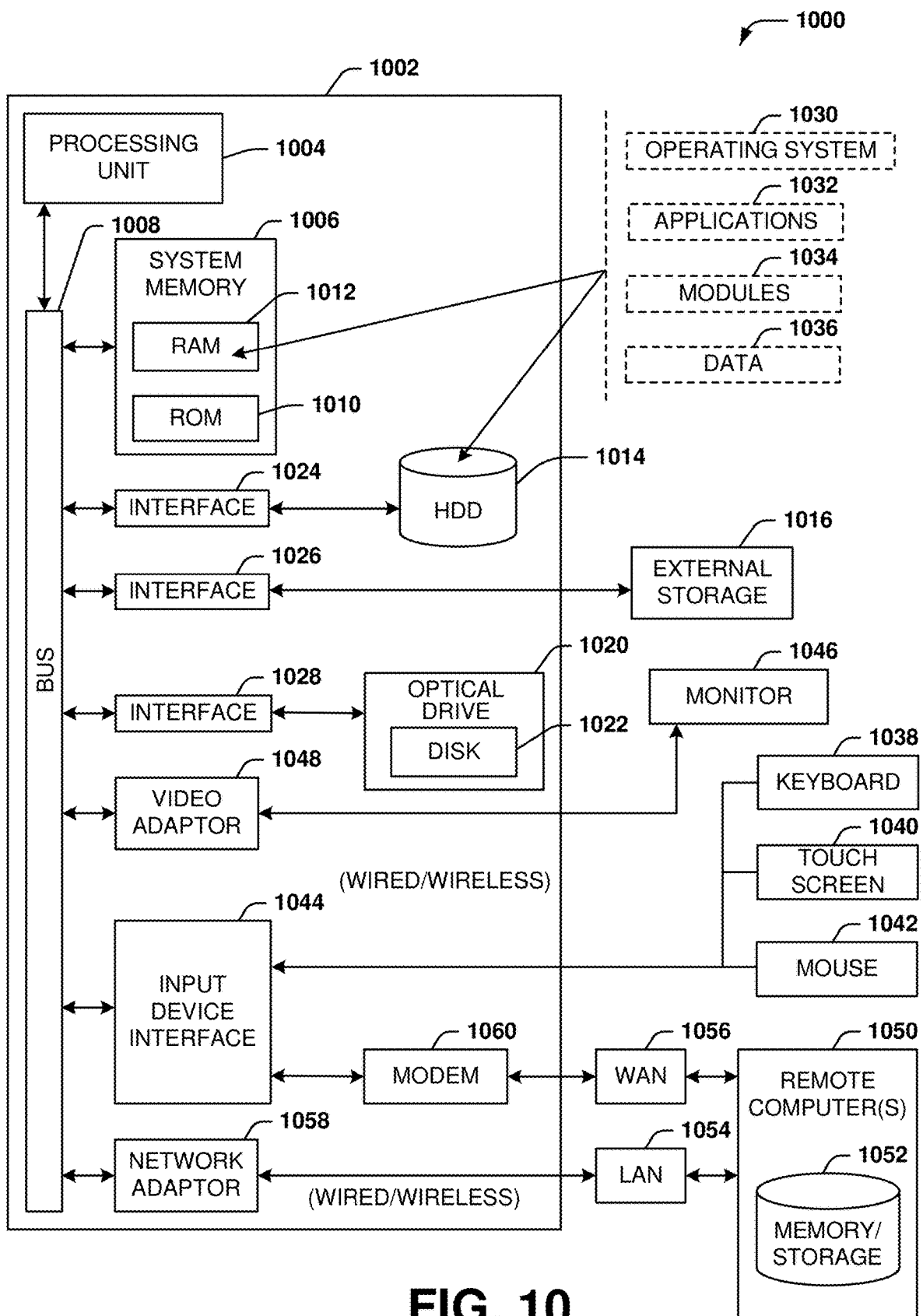
FIG. 10 is a block diagram of an example computer that can be operable to execute processes and methods in accordance with various aspects and embodiments of the subject disclosure.

FIG. 10 is a block diagram of an example computer that can be operable to execute processes and methods in accordance with various aspects and embodiments of the subject disclosure. The example computer can be adapted to implement, for example, any of the various network equipment described herein.

FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), smart card, flash memory (e.g., card, stick, key drive) or other memory technology, compact disk (CD), compact disk read only memory (CD-ROM), digital versatile disk (DVD), Blu-ray™ disc (BD) or other optical disk storage, floppy disk storage, hard disk storage, magnetic cassettes, magnetic strip(s), magnetic tape, magnetic disk storage or other magnetic storage devices, solid state drives or other solid state storage devices, a virtual device that emulates a storage device (e.g., any storage device listed herein), or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art can recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   detecting, by equipment comprising a processor, an anomaly in public service access point call routing data,
   wherein the public service access point call routing data comprises data associated with respective user equipment calls routed via a cellular communication network to respective public service access points,
   wherein the anomaly indicates a user equipment call of the respective user equipment calls was routed via the cellular communication network to a first public service access point of the respective public service access points, the first public service access point having a first efficiency for the user equipment call, and
   wherein the first efficiency is lower than a second efficiency associated with a second public service access point of the respective public service access points;
   in response to detecting the anomaly, generating, by the equipment, public service access point call routing analysis data to enable analysis of the anomaly;
   receiving, by the equipment, a public service access point call routing modification input; and
   storing, by the equipment, the public service access point call routing modification input in a knowledge base adapted for use in connection with a future identification of the second public service access point in response to a future anomaly.

2. The method of claim 1, wherein the respective user equipment calls comprise emergency calls to emergency response centers.

3. The method of claim 1, wherein the anomaly is based on load data representing a first call load at the first public service access point and a second call load at the second public service access point.

4. The method of claim 1, wherein the anomaly is based on call re-routing data representing call re-routing of the user equipment call from the first public service access point to the second public service access point.

5. The method of claim 1, wherein the anomaly is based on a first location of the first public service access point, a second location of the second public service access point, and a third location of user equipment associated with the user equipment call, and wherein a first distance from the first location to the third location is longer than a second distance from the second location to the third location.

6. The method of claim 1, further comprising:
reconfiguring, by the equipment, network equipment of the cellular communication network according to the public service access point call routing modification input, to thereby to route future public service access point calls that originate proximal to a location of user equipment associated with the user equipment call to the second public service access point.

7. The method of claim 1, further comprising generating, by the equipment, a public service access point call routing modification suggestion comprising an identification of the second public service access point.

8. The method of claim 1, wherein the public service access point call routing analysis data comprises a map view, and wherein the map view comprises:
a map,
a first indication on the map of a first public service access point location associated with the first public service access point,
a second indication on the map of a second public service access point location associated with the second public service access point, and
a third indication on the map of a location of user equipment associated with the user equipment call.

9. The method of claim 8, wherein the map view further comprises a fourth indication on the map of a cell sector coverage region associated with a cell sector of the cellular communication network, and wherein the cell sector processed the user equipment call.

10. The method of claim 8, wherein the map view further comprises:
a fourth indication on the map of a first public service access point region associated with the first public service access point, and
a fifth indication on the map of a second public service access point region associated with the second public service access point.

11. The method of claim 1, where the detecting of the anomaly is based on analysis data, and wherein the analysis data includes relative loads, a distribution of user equipment locations, capacity, and traffic patterns.

12. The method of claim 1, wherein the detecting is based on an event corresponding to a cellular network update that results in new cell sector regions.

13. Network equipment, comprising:
a processor; and
a memory that stores executable instructions that, when executed by the processor, facilitate performance of operations, comprising:
detecting an anomaly in public service access point call routing data,
wherein the public service access point call routing data comprises data associated with respective user equipment calls routed via a cellular communication network to respective public service access points,
wherein the anomaly indicates a user equipment call of the respective user equipment calls was routed via the cellular communication network to a first public service access point of the respective public service access points, the first public service access point having a first efficiency for the user equipment call, and
wherein the first efficiency is lower than a second efficiency associated with a second public service access point of the respective public service access points;
in response to detecting the anomaly, generating a public service access point call routing modification suggestion comprising an identification of the second public service access point;
receiving a public service access point call routing modification input;
reconfiguring the cellular communication network according to the routing modification input, to thereby route future public service access point calls that originate proximal to a location of user equipment associated with the user equipment call to the second public service access point; and
storing the public service access point call routing modification input in a knowledge base adapted for use in connection with a future identification of the second public service access point in response to a future anomaly.

14. The network equipment of claim 13, wherein the operations further comprise providing the public service access point call routing modification suggestion to a user interface based on the generating of the public service access point call routing modification suggestion.

15. The network equipment of claim 13, wherein the anomaly is based on a cell sector coverage region associated with a cell sector of the cellular communication network, wherein the cell sector processed the user equipment call, and wherein the cell sector comprises a first portion within a first boundary associated with the first public service access point and a second portion within a second boundary associated with the second public service access point.

16. The network equipment of claim 14, wherein the receiving of the public service access point call routing modification input is based on the providing of the public service access point call routing modification suggestion to the user interface.

17. A non-transitory machine-readable medium, comprising executable instructions that, when executed by a processor, facilitate performance of operations, comprising:
detecting an anomaly in public service access point call routing data,
wherein the public service access point call routing data comprises data associated with respective user equipment calls routed via a cellular communication network to respective public service access points,
wherein the anomaly indicates a user equipment call of the respective user equipment calls was routed via the cellular communication network to a first public service access point of the respective public service access points, the first public service access point having a first efficiency for the user equipment call, and wherein the first efficiency is lower than a second efficiency associated with a second public service access point of the respective public service access points; and in response to detecting the anomaly, reconfiguring network equipment of the cellular communication network to thereby to route future public service access point calls that originate proximal to a location of user equipment associated with the user equipment call to the second public service access point, wherein reconfiguring the network equipment of the cellular communication network comprises accessing a knowledge base comprising previously detected anomalies and previous public service access point call routing modification inputs responsive to the previously detected anomalies.

18. The non-transitory machine-readable medium of claim 17, wherein the public service access point call routing data further comprises cell sector data representing coverage areas of cell sectors associated with the respective user equipment calls, user equipment location data representing locations of user equipment associated with the respective user equipment calls, and public service access point load data representing call loads at the respective public service access points.

19. The non-transitory machine-readable medium of claim 17, wherein detecting the anomaly is in response to:

receiving public service access point boundary data comprising respective boundaries associated with the respective public service access points; or receiving cell update data comprising respective regions associated with respective cell sectors of the cellular communication network.

20. The non-transitory machine-readable medium of claim 17, wherein the anomaly is based on a first location of the first public service access point, a second location of the second public service access point, and a third location of user equipment associated with the user equipment call, and wherein a first distance from the first location to the third location is longer than a second distance from the second location to the third location.

* * * * *